UNITED STATES PATENT OFFICE.

GUY C. GIVEN, HOWARD S. McQUAID, AND RALPH A. LONG, OF TAMAQUA, PENNSYLVANIA, ASSIGNORS TO ATLAS POWDER COMPANY, OF WILMINGTON, DELAWARE, A CORPORATION OF DELAWARE.

PROCESS OF MANUFACTURING AMMONIUM PERCHLORATE FROM SODIUM PERCHLORATE AND AMMONIUM SULFATE.

1,342,956. Specification of Letters Patent. Patented June 8, 1920.

No Drawing. Application filed October 23, 1918. Serial No. 259,421.

*To all whom it may concern:*

Be it known that we, GUY CUMSTON GIVEN, HOWARD STAFFORD McQUAID, and RALPH AUSTIN LONG, citizens of the United States of America, residing at Tamaqua, in the county of Schuylkill and State of Pennsylvania, have invented certain new and useful Improvements in Processes of Manufacturing Ammonium Perchlorate from Sodium Perchlorate and Ammonium Sulfate, of which the following is a specification.

No method has hitherto been known for the manufacture through a continuous process of ammonium perchlorate from sodium perchlorate and ammonium sulfate by which pure ammonium perchlorate is produced and in which the by-product (sodium sulfate) is obtained in such form that it is unnecessary to recrystallize the same in order to remove valuable materials. This invention relates to the provision of such a process.

We have discovered a process in which the reaction between equivalent quantities of sodium perchlorate and ammonium sulfate, when added to a previously prepared nucleus solution containing the correct proportions of sodium ions and perchlorate ions, is such, that pure anhydrous sodium sulfate separates from the solution, leaving such a small quantity of this material present in the solution that upon the separation by filtration of the sodium sulfate, the filtrate, after the addition of as small a quantity as five per cent. of water, may be cooled to 20° C., giving a large yield of pure ammonium perchlorate.

The mother liquid from the ammonium perchlorate, when concentrated to a degree depending upon the conditions under which the subsequent operations are to be performed, forms again the hereinbefore mentioned nucleus solution for the new cycle of performance of the process.

In our process the proper excess of sodium perchlorate is maintained in the solution throughout the reaction, thus producing the proper depression of the solubility of the sodium sulfate at the high temperature, and of the ammonium perchlorate at the low temperature, on account of the effect of the common ion in each case.

A nucleus solution is prepared at 100° C. to contain 12.2% ammonium perchlorate, 6.0% sodium perchlorate, and 15.5% sodium sulfate. To this solution is then added the proper amounts of sodium perchlorate and ammonium sulfate, to produce a solution containing 32.5% ammonium perchlorate, 5.5% sodium perchlorate and 12.0% sodium sulfate, and the anhydrous sodium sulfate which separates at this temperature is removed. The filtrate is diluted with a quantity of water so that, when cooled to 20° C., the resulting solution will contain 11.7% ammonium perchlorate, 6.8% sodium perchlorate, and 14.9% sodium sulfate. The solution is then cooled to the above mentioned temperature and the pure ammonium perchlorate removed. The mother liquid from the ammonium perchlorate is concentrated by evaporation until it has the same concentration of dissolved salts as the original nucleus solution.

Having described our invention, what we claim is:

1. The herein described process which consists of adding sodium perchlorate and ammonium sulfate to a nucleus solution containing ammonium perchlorate, sodium perchlorate and sodium sulfate, removing the anhydrous sodium sulfate and separating out the ammonium perchlorate below 22° C.

2. The herein described process which consists of employing a nucleus solution containing approximately 12.2 per cent. ammonium perchlorate, 6.0 per cent. sodium perchlorate, and 15.5 per cent. sodium sulfate; adding thereto the proper amounts of sodium perchlorate and ammonium sulfate to produce a solution containing 32.5% ammonium perchlorate, 5.5% sodium perchlorate and 12.0% sodium sulfate and removing the sodium sulfate which separates therefrom, diluting the remaining liquid and then removing the ammonium perchlorate.

In testimony whereof we affix our signatures in the presence of two witnesses.

GUY C. GIVEN.
HOWARD S. McQUAID.
RALPH A. LONG.

Witnesses:
SAMUEL R. BEARD,
FRANCES M. BEARD.